(12) United States Patent
Zhang

(10) Patent No.: US 10,216,472 B2
(45) Date of Patent: Feb. 26, 2019

(54) ELECTRONIC DEVICE AND METHOD FOR PROCESSING AUDIO DATA

(71) Applicant: Toshiba Client Solutions Co., Ltd., Tokyo (JP)

(72) Inventor: Qi Zhang, Kokubunji Tokyo (JP)

(73) Assignee: TOSHIBA CLIENT SOLUTIONS CO., LTD., Tokyo (JP)

( * ) Notice: Subject to any disclaimer, the term of this patent is extended or adjusted under 35 U.S.C. 154(b) by 499 days.

(21) Appl. No.: 14/876,790

(22) Filed: Oct. 6, 2015

(65) Prior Publication Data

US 2016/0321029 A1 Nov. 3, 2016

Related U.S. Application Data

(60) Provisional application No. 62/154,229, filed on Apr. 29, 2015.

(51) Int. Cl.

| | |
|---|---|
| *G06F 3/048* | (2013.01) |
| *G06F 3/16* | (2006.01) |
| *G06F 3/0488* | (2013.01) |
| *G06F 3/14* | (2006.01) |
| *G06F 3/0484* | (2013.01) |
| *G06F 3/0481* | (2013.01) |

(52) U.S. Cl.
CPC ............ *G06F 3/165* (2013.01); *G06F 3/0481* (2013.01); *G06F 3/0484* (2013.01); *G06F 3/04883* (2013.01); *G06F 3/1423* (2013.01); *G06F 3/1462* (2013.01); *G09G 2370/022* (2013.01); *G09G 2370/16* (2013.01)

(58) Field of Classification Search
CPC ......... G06Q 50/01; H04L 51/32; H04L 67/02; H04L 67/22; H04L 67/306; G06F 3/017
See application file for complete search history.

(56) References Cited

U.S. PATENT DOCUMENTS 6,557,042 B1 * 4/2003 He ..................... G06F 17/30017
707/999.001
9,542,669 B1 * 1/2017 Browning ............ G06Q 10/109
(Continued)

FOREIGN PATENT DOCUMENTS

| JP | 2007189448 A | 7/2007 |
|---|---|---|
| JP | 2007215053 A | 8/2007 |
| JP | 2010109464 A | 5/2010 |

*Primary Examiner* — Claudia Dragoescu
(74) *Attorney, Agent, or Firm* — Kim & Stewart LLP

(57) ABSTRACT

An electronic device includes a microphone recording audio data comprising first and second sections, a screen capable of detecting input of strokes on a surface thereof, a receiver configured to receive stroke data representing strokes input on other electronic devices during a period of the recording, and a hardware processor. The hardware process is configured to determine a first number of users who performed or devices that processed handwriting inputs in the first section, determine a second number of users who performed or devices that processed handwriting inputs in the second section, conditionally display on the screen a first object representing the first section in a first display style, and conditionally display on the screen a second object representing the second section in a second display style, the first and second numbers being different and the first and second display styles being visually distinguishable from each other.

6 Claims, 15 Drawing Sheets

(56) References Cited

U.S. PATENT DOCUMENTS

| | | | |
|---|---|---|---|
| 2007/0168448 A1* | 7/2007 | Garbow | H04L 12/1831 709/207 |
| 2009/0210779 A1* | 8/2009 | Badoiu | G06F 17/3082 715/230 |
| 2010/0251295 A1* | 9/2010 | Amento | G11B 27/034 725/38 |
| 2013/0311178 A1* | 11/2013 | Lee | G10L 15/26 704/235 |
| 2015/0081713 A1* | 3/2015 | Alonso | G06Q 10/109 707/738 |
| 2015/0180820 A1* | 6/2015 | Lee | G06Q 50/01 709/206 |

* cited by examiner

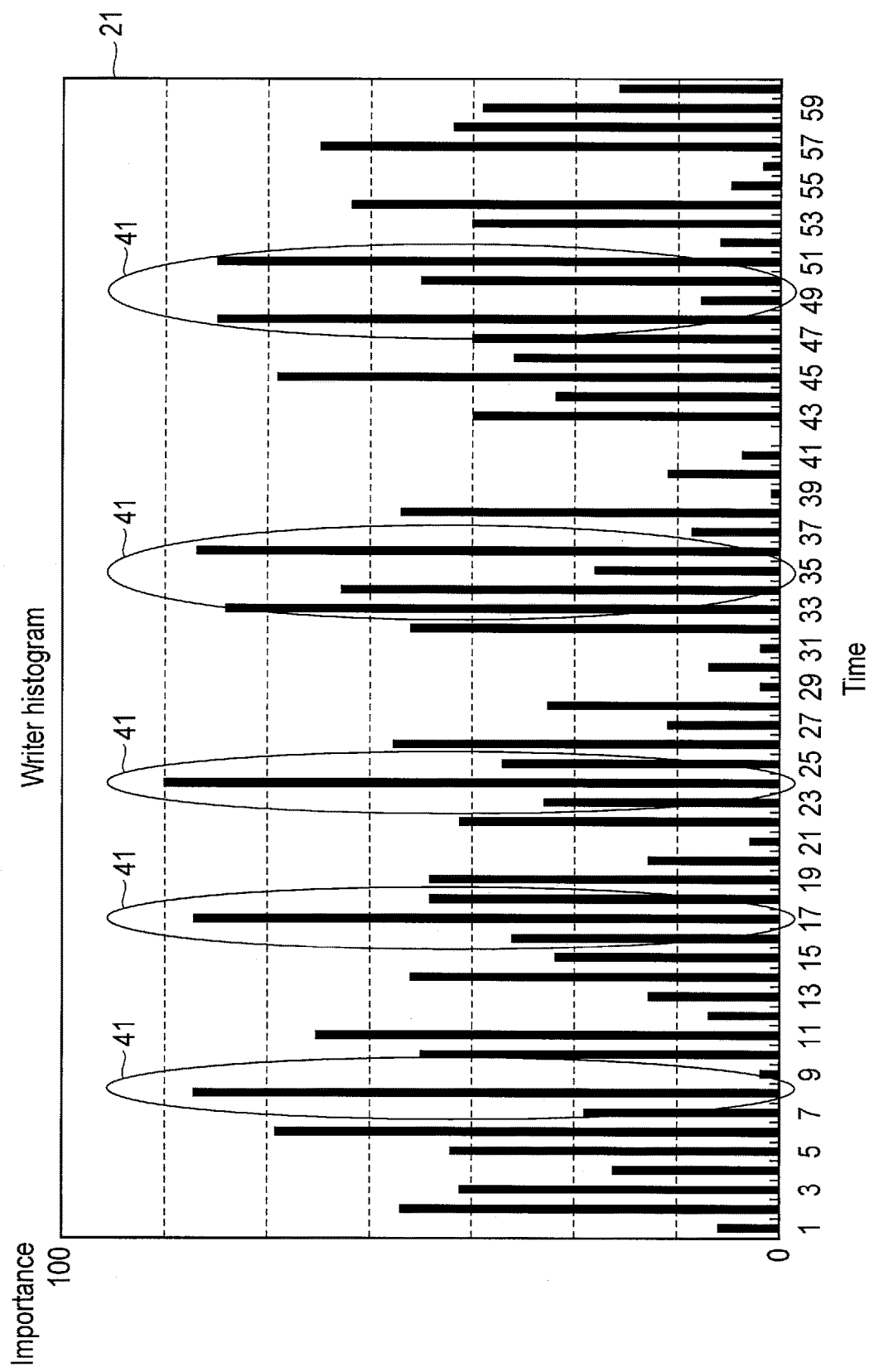
F I G. 6

200

| X11, Y11, T11 | ----- SD11 ⎫ |
| X12, Y12, T12 | ----- SD12 ⎬ SD1 |
| X1n, Y1n, T1n | ----- SD1n ⎭ |

| X21, Y21, T21 | ----- SD21 ⎫ |
| X22, Y22, T22 | ----- SD22 ⎬ SD2 |
| X2n, Y2n, T2n | ----- SD2n ⎭ |

| X31, Y31, T31 | ----- SD31 ⎫ |
| X32, Y32, T32 | ----- SD32 ⎬ SD3 |
| X3n, Y3n, T3n | ----- SD3n ⎭ |

| X41, Y41, T41 | ----- SD41 ⎫ |
| X42, Y42, T42 | ----- SD42 ⎬ SD4 |
| X4n, Y4n, T4n | ----- SD4n ⎭ |

| X51, Y51, T51 | ----- SD51 ⎫ |
| X52, Y52, T52 | ----- SD52 ⎬ SD5 |
| X5n, Y5n, T5n | ----- SD5n ⎭ |

| X61, Y61, T61 | ----- SD61 ⎫ |
| X62, Y62, T62 | ----- SD62 ⎬ SD6 |
| X6n, Y6n, T6n | ----- SD6n ⎭ |

| X71, Y71, T71 | ----- SD71 ⎫ |
| X72, Y72, T72 | ----- SD72 ⎬ SD7 |
| X7n, Y7n, T7n | ----- SD7n ⎭ |

F I G. 13

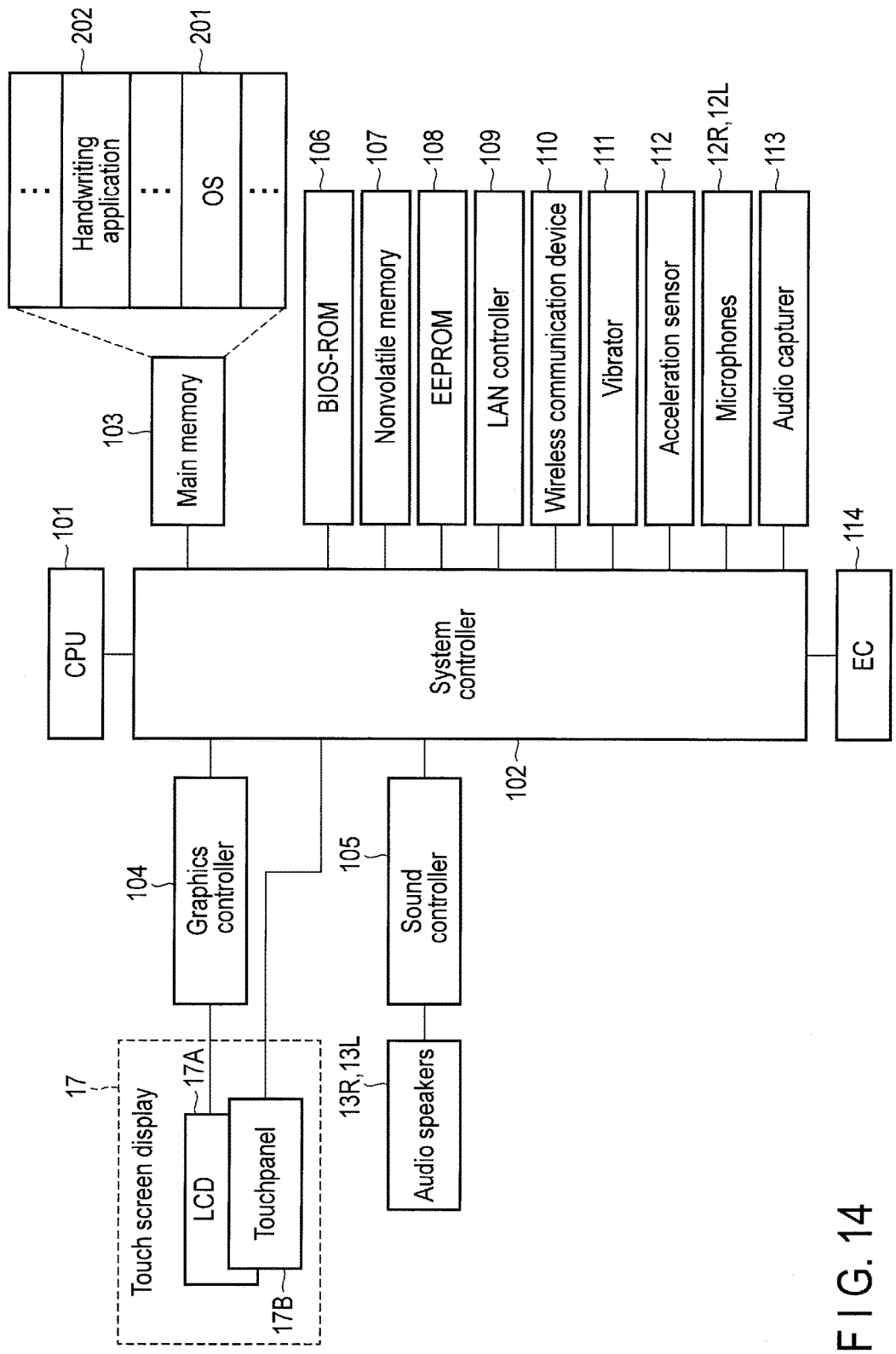
F I G. 14

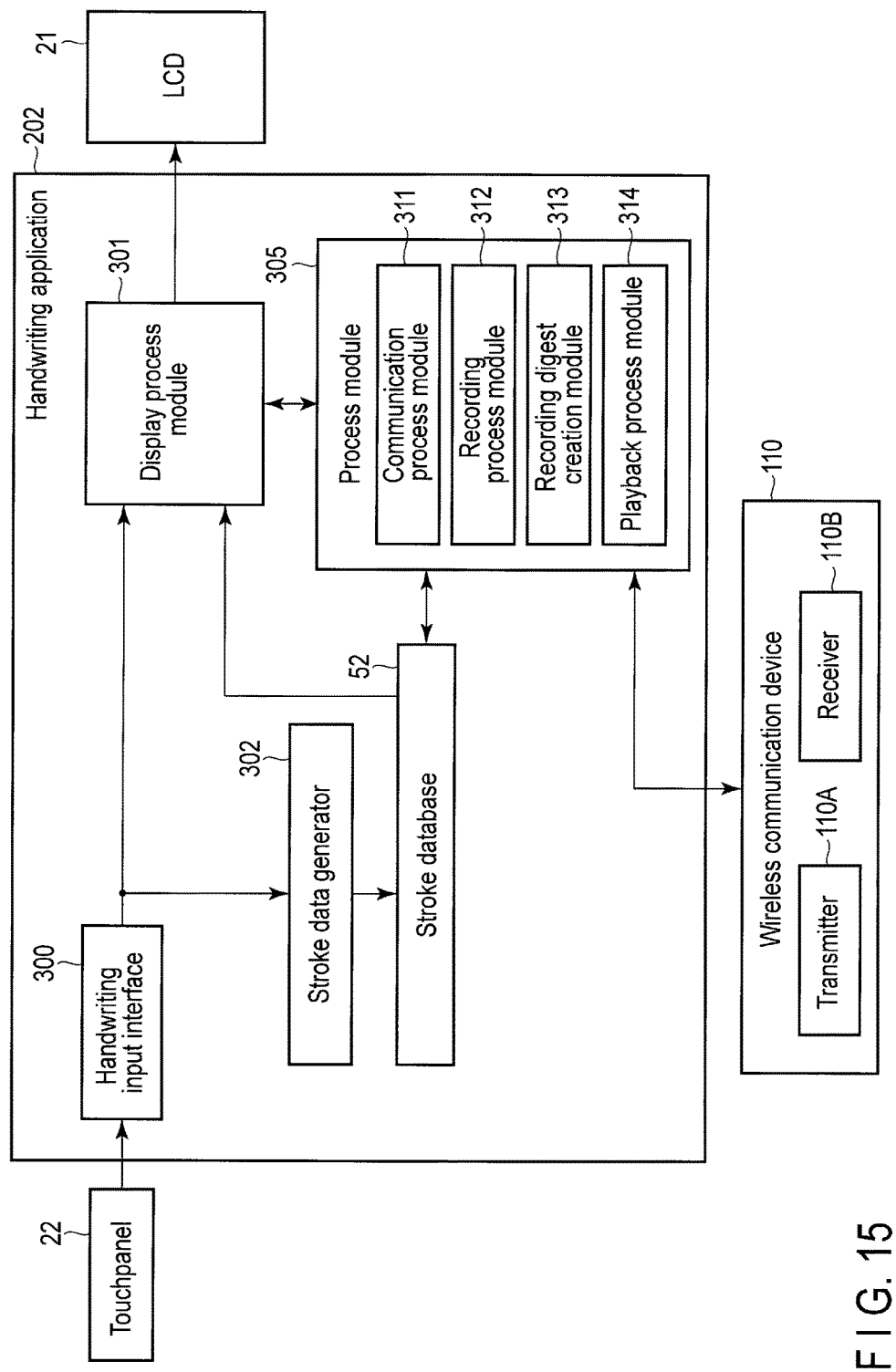
F I G. 15

Total time length of recording digest

[_____ Minutes]

F I G. 19

ELECTRONIC DEVICE AND METHOD FOR PROCESSING AUDIO DATA

CROSS-REFERENCE TO RELATED APPLICATION

This application is based upon and claims the benefit of priority from the U.S. Provisional Patent Application No. 62/154,229, filed Apr. 29, 2015, the entire contents of which are incorporated herein by reference.

FIELD

Embodiments described herein relate generally to a technique for processing audio data.

BACKGROUND

In recent years, various electronic devices such as personal computers, tablets, smartphones have been developed. Most of them can record, store, and play back various audio sources such as music and voice.

For example, users can record business conferences and lectures in an electronic device and later listen to the recorded data in the electronic device.

However, users often spend many hours to listen to the recorded data.

Furthermore, users are required to change playback positions, in order to find the desired portion of the recorded data, users are required to listen to the recorded data to move to the desired playback portion.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 6 is one example of recorded data displayed by the electronic device of FIG. 1.

FIG. 13 is an exemplary diagram that illustrates time series data (stroke data) corresponding to the handwriting document of FIG. 12.

FIG. 14 is an exemplary block diagram illustrating a structure of the electronic device of FIG. 1.

FIG. 15 is an exemplary block diagram illustrating a structure of a handwriting application program executed by the electronic device of FIG. 1.

FIG. 19 is an exemplary view illustrating a user interface displayed by the electronic device of FIG. 1.

DETAILED DESCRIPTION

Various embodiments will be described hereinafter with reference to the accompanying drawings.

In general, according to one embodiment, an electronic device includes a microphone capable of recording audio data comprising first and second sections, a screen capable of detecting input of strokes on a surface thereof, a receiver configured to receive stroke data representing strokes input on other electronic devices during a period of the recording, and a hardware processor. The hardware process is configured to determine a first number of users who performed or devices that processed handwriting inputs in the first section, determine a second number of users who performed or devices that processed handwriting inputs in the second section, conditionally display on the screen a first object representing the first section in a first display style, and conditionally display on the screen a second object representing the second section in a second display style, the first and second numbers being different and the first and second display styles being visually distinguishable from each other.

Figure 1:
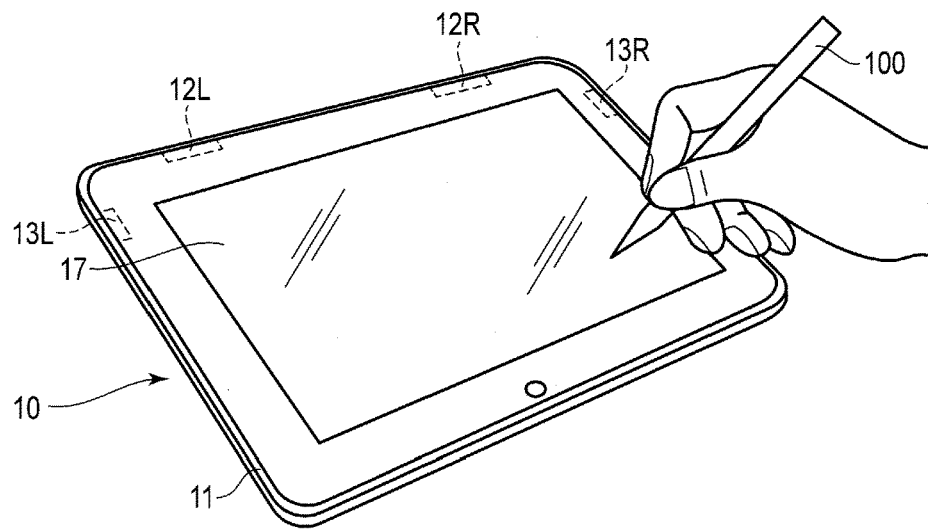
FIG. 1 is an exemplary perspective view illustrating an exterior of an electronic device of an embodiment.

FIG. 1 is a perspective view which shows an exterior of an electronic device of one embodiment. The electronic device is, for example, a pen base portable electronic device which can accept a handwriting input by a pen (e.g., stylus) or a finger.

The electronic device can be realized as a tablet computer, notebook personal computer, smartphone, PDA, or the like. Hereinafter, the example of an electronic device will be given as a tablet computer 10.

The tablet computer 10 is a portable electronic device which may be referred to as tablet or slate computer. The tablet computer 10 includes a main body 11 and a touch screen display 17 as shown in FIG. 1. The touch screen display 17 is attached on the upper surface of the main body 11.

The main body 11 has a thin box-shaped casing. Microphones 12R and 12L are disposed at two predetermined positions in the main body 11, namely, two positions spaced apart on the upper edge of the main body 11. Furthermore, audio speakers 13R and 13L are disposed at two predetermined positions in the main body, namely, the right side surface and the left side surface of the main body 11.

The touch screen display includes a flat panel display and a sensor. The sensor detects a position (contact position) on the screen of the flat panel display to which a pen or a finger contacts. The flat panel display may be a liquid crystal device (LCD), for example. The sensor may be a capacitive touch panel or an electromagnetic induction-type digitizer. Both the digitizer and the touch panel may be incorporated into the touch screen display 17.

The touch screen display 17 can detect a position of contact of a finger with the screen or a position of contact of a pen with the screen. The pen 100 may be an electromagnetic induction pen (digitizer pen). A user can write a character and the like on the screen of the touch screen display 17 with an external object (finger or pen 100). During this handwriting operation, loci of movement of the external object on the screen, that is, strokes input by handwriting are drawn on the screen in real time. The loci of movement of the external object in contact with the screen is one stroke. A collection of a number of strokes corresponding to handwritten characters and handwritten figures constitutes a handwritten document.

One stroke is represented by a collection of a plurality of point data corresponding to a plurality of points on the stroke. Each point data indicates coordinates (X coordinate and Y coordinate) of the point. As mentioned above, the external object may be either the pen 100 or the finger, and hereinafter, the description assumes that the pen 100 is used for the handwriting input.

In addition, the tablet computer 10 has a handwriting collaboration engine. The handwriting collaboration includes sound recording assist service and handwriting share service.

The sound recording assist service can determine high priority sections (important sections) in audio data recorded in a business conference or a lecture. In this embodiment, the sound recording assist service determines the high priority sections (important sections) in the audio data based on the number of writers in individual sections in the audio data. For example, the sound recording assist service may determine that a section with more writers has a higher priority (importance) since, in general, most users take notes during important parts of a speech.

The number of writers may be the number of users who performed handwriting during recording of audio data. Or, the number of writers may be the number of terminals used for handwriting during recording of audio data. The section in the audio data with more users who performed handwriting or more terminals used for handwriting can be interpreted as a section including a speech considered important by many users.

The high priority sections (important sections) may also be determined based on the number of strokes input by handwriting. However, the number of handwriting strokes will vary significantly user to user.

That is, some of the users may draw a figure (illustration) composed of many handwriting strokes during an important part of the speech while some other users may write just few handwriting strokes during the same part of the speech.

Therefore, if the high priority sections (important sections) are determined based on the number of strokes, the high priority sections corresponding to the speech considered important by the majority of users may not be determined correctly.

In the present embodiment, priority of each individual section is determined based on the number of writers corresponding to that section, that is, the number of users who performed handwriting or the number of devices used for handwriting. Therefore, the high priority sections corresponding to the speech considered important by a majority of users can be determined without depending on the number of strokes.

If the sound recording assist service is activated, the handwriting collaboration engine may exchange a handwriting input start/end event (handwriting input start event and handwriting input end event) between the tablet computer 10 and another device which can accept a handwriting input while recording a business conference or a lecture.

The handwriting input start event may include time data corresponding to a start time of a handwriting input (handwriting start time stamp). The handwriting start time stamp may indicate a point in time of start of a handwriting stroke or a point in time a little before the start of a handwriting stroke.

The handwriting end event may include time data corresponding to an end time of a handwriting input (handwriting end time stamp). A handwriting input currently being made may be determined to be ended if a period of suspending a handwriting input reaches a threshold time. The handwriting input currently being made may be determined to be continued if a new handwriting stroke input starts before the period of suspending a handwriting input reaches the threshold time.

The handwriting end time stamp may indicate a point in time of ending a handwriting stroke input or a point in time a little before the end of the handwriting stroke input.

The handwriting share service executes a service to share handwriting data (stroke data) between a plurality of electronic devices.

If the handwriting share service is activated, the handwriting collaboration engine distributes stroke data handwritten in the electronic devices participating in (e.g., logged-into) the handwriting share service in real time between the other electronic devices participating in (logged-into) the same service. Therefore, content of the handwriting document displayed on display screens of these electronic devices can be synchronized.

Figure 2:
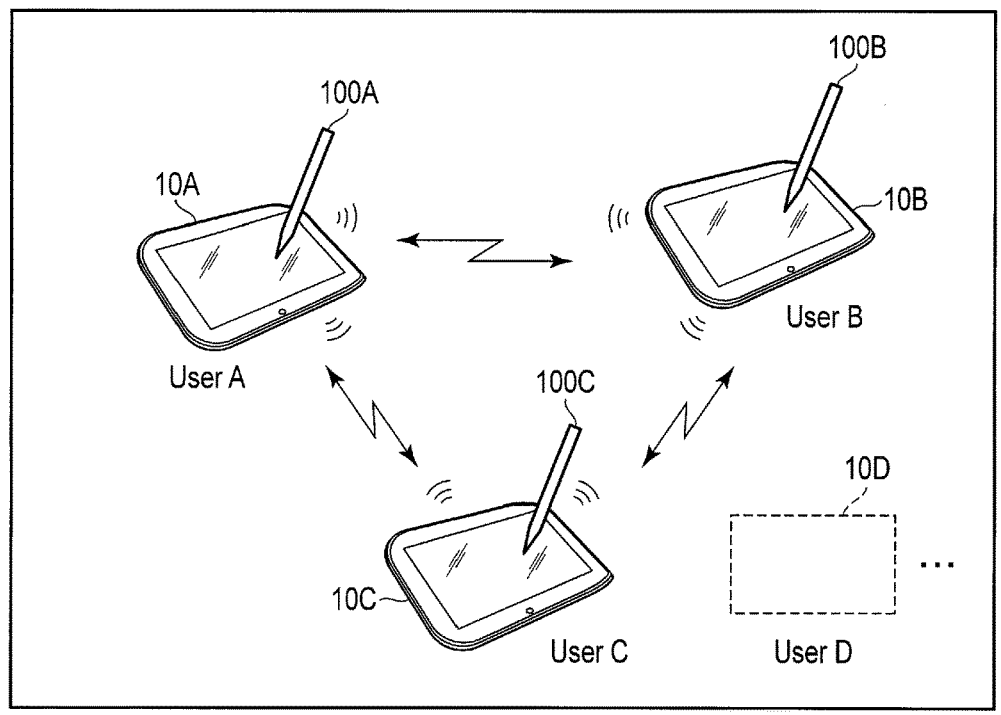
FIG. 2 is an exemplary view illustrating connection between electronic devices (terminals) using a sharing service.

FIG. 2 shows an example of connection between electronic devices (terminals) using the sound recording assist service or the handwriting share service.

An electronic device 10A is a tablet computer used by user A. An electronic device 10B is a tablet computer used by user B. An electronic device 10C is a tablet computer used by user C.

Each of the electronic devices 10A, 10B, and 10C has a handwriting collaboration engine which is similar to that of the tablet computer 10 of the present embodiment.

Electronic devices 10A, 10B, and 10C are linked to each other through a wired network or a wireless network. Hereinafter, an example where electronic devices 10A, 10B, and 10C are linked to each other via a wireless network is given. Furthermore, electronic device 10D may participate in the shared service. Electronic device 10D is a tablet computer used by user D.

The network used for wireless link between electronic devices 10A, 10B, and 10C may be any network which can link multiple devices to each other wirelessly. For example, Wi-Fi Direct (registered trademark) or Bluetooth (registered trademark) may be used. Or, electronic devices 10A, 10B, and 10C may be linked to each other wirelessly through a wireless LAN router. Or, a network structure in which each of electronic devices 10A, 10B, and 10C is wirelessly linked to a specific server may be used.

Each device (terminal) may log into the service using a device unique ID (account). Or, the device may log into the service using an ID of a user of the device. That is, login and logout to and of the service may be performed by using the electronic device unique ID (account) or by using the user ID (account).

Now, an example where electronic devices 10A, 10B, and 10C log into the sound recording assist service is given. Each of electronic devices 10A, 10B, and 10C displays an edit screen which can accept a handwriting input. In the sound recording assist service, each electronic device has its own edit screen and a stroke handwritten therein is not displayed on an edit screen of a different device. Electronic devices 10A, 10B, and 10C are used in the same area such as a conference room or a school classroom. Each of electronic devices 10A, 10B, and 10C can record a conference or a lecture.

If users A, B, and C perform handwriting on their own electronic devices, the strokes handwritten are displayed on the edit screens of their respective electronic devices. Then, the above handwriting input start/end event (handwriting input start event and handwriting input end event) is exchanged between the electronic devices.

Each electronic device may transmit (broadcast) handwriting input start/end event generated thereon to the other devices. Furthermore, each electronic device receives handwriting input start/end events from the other devices. Each electronic device can calculate a statistic of the number of writers in individual time periods during recording, based on the handwriting input start/end event generated on the electronic device itself and the handwriting input start/end events received from the other devices. The number of writers in a certain time period may be the number of users who performs a handwriting input during the time period, or the number of devices by which a handwriting input is made during the time period.

In a device with a larger screen, several users may perform handwriting on the edit screen of the device using pens. The pens may have different pen IDs. In that case, individual users who perform handwriting on the device may be specified based on the pen IDs.

Now, an example where two users perform handwriting during the same time period in the same device is given. In this case, if the number of users who perform handwriting is counted as the number of writers, the number of writers (the number of users who perform handwriting) is counted as two. On the other hand, if the number of devices by which handwriting is performed is counted as the number of writers, the number of writers (the number of devices by which handwriting is performed) is counted as one.

In the handwriting share service, stroke data handwritten by users A, B, and C in their own respective electronic devices are not only displayed on their own respective handwriting share screen (canvas) but also reflected on handwriting share screens (canvases) of the electronic devices of the other users. As a result, stroke data (handwritten characters, handwritten figures, and the like) handwritten by users A, B, and C can be exchanged and shared between users A, B, and C.

Furthermore, electronic devices 10A, 10B, and 10C can display shared content such as conference document on the canvases. In that case, the stroke data handwritten on each electronic device are displayed on the content. Users A, B, and C can refer to the same content and at the same time exchange and share the handwritten characters, handwritten figures, and the like, which are handwritten on the content.

Note that in the sound recording assist service, stroke data may be exchanged and shared between the devices as in the handwriting share service.

Figure 3:
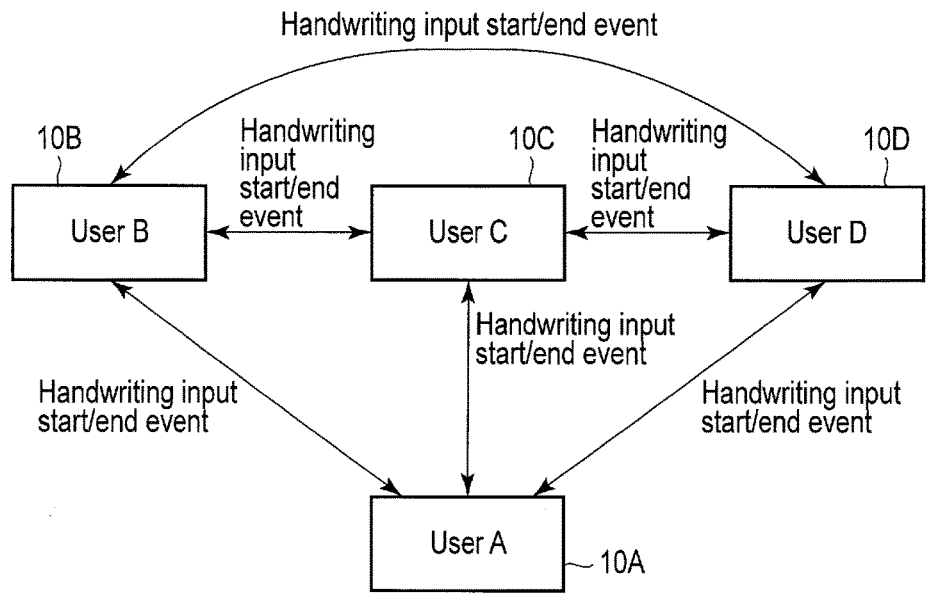
FIG. 3 is an exemplary diagram illustrating the data flow between the electronic device of FIG. 1 and the other electronic devices.

FIG. 3 shows a process of exchanging handwriting input start/end event (handwriting input start event and handwriting input end event) between electronic devices (terminals) 10A, 10B, 10C, and 10D.

When user A starts a handwriting input on the electronic device 10A, the electronic device 10A broadcasts a handwriting input start event to electronic devices (terminals) 10B, 10C, and 10D. When the handwriting input currently being made is finished on the electronic device 10A, that is, when a time period reaches a threshold time after the handwriting input currently being made is suspended, the electronic device 10A broadcasts the handwriting input end event to electronic devices (terminals) 10B, 10C, and 10D.

Similarly, when user B starts a handwriting input on the electronic device 10B, the electronic device 10B broadcasts a handwriting input start event to electronic devices (terminals) 10A, 10C, and 10D. Furthermore, when the handwriting input currently being made is finished on the electronic device 10B, that is, when a time period reaches a threshold time after the handwriting input currently being made is suspended, the electronic device 10B broadcasts the handwriting input end event to electronic devices (terminals) 10A, 10C, and 10D.

Similarly, when user C starts a handwriting input on the electronic device 10C, the electronic device 10C broadcasts a handwriting input start event to electronic devices (terminals) 10A, 10B, and 10D. Furthermore, when the handwriting input currently being made is finished on the electronic device 10C, that is, when a time period reaches a threshold time after the handwriting input currently being made is suspended, the electronic device 10C broadcasts the handwriting input end event to electronic devices (terminals) 10A, 10B, and 10D.

Similarly, when user D starts a handwriting input on the electronic device 10D, the electronic device 10D broadcasts a handwriting input start event to electronic devices (terminals) 10A, 10B, and 10C. Furthermore, when the handwriting input currently being made is finished on the electronic device 10D, that is, when a time period reaches a threshold time after the handwriting input currently being made is suspended, the electronic device 10D broadcasts the handwriting input end event to electronic devices (terminals) 10A, 10B, and 10C.

Each of electronic devices (terminals) 10A, 10B, 10C, and 10D can calculate a statistic of the number of writers (the number of users who performs handwriting inputs or the number of devices by which handwriting inputs are performed) in individual time periods during recording based on the handwriting input start/end event generated on the electronic device itself and the handwriting input start/end events received from the other devices.

Then, each of electronic devices (terminals) 10A, 10B, 10C, and 10D determines the priority (importance) corresponding to individual sections of the recorded data using the number of writers (the number of users who performs handwriting inputs or the number of devices by which handwriting inputs are performed) in the individual time periods.

Figure 4:
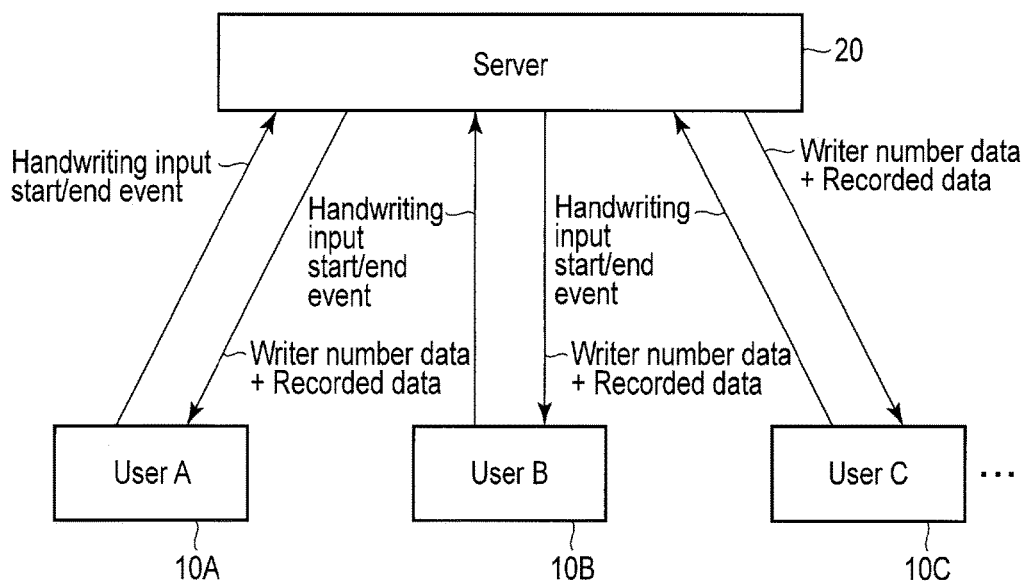
FIG. 4 is an exemplary diagram illustrating the data flow between the electronic device of FIG. 1 and a server.

FIG. 4 shows a network structure in which electronic devices 10A, 10B, 10C, and 10D are wirelessly connected to a server 20.

In the network structure of FIG. 4, writer number data which indicate a statistic of the number of writers in individual time periods may be obtained by the server 20. That is, each of electronic devices 10A, 10B, and 10C transmits the handwriting input start/end event to the server 20 and do not transmit it to the other devices.

The server 20 calculates a statistic of the number of writers (the number of users who performs handwriting inputs or the number of devices by which handwriting inputs are performed) in individual time periods during recording based on the handwriting input start/end events from each electronic device. Then, the server 20 distributes the writer number data which indicate the number of writers in individual time periods to electronic devices 10A, 10B, and 10C at the end of the conference or the lecture, for example. The writer number data may be automatically transmitted from the server 20 to electronic devices 10A, 10B, and 10C, or each of electronic devices 10A, 10B, and 10C may download the writer number data from the server 20 based on an operation by a user.

Furthermore, recording of the conference and lecture may be performed by the server 20. In this case, the server 20 may distribute both the writer number data and the recorded data (audio data) to electronic devices 10A, 10B, and 10C. The writer number data and the recorded data may be automatically transmitted from the server 20 to electronic devices 10A, 10B, and 10C. Or, each of electronic devices 10A, 10B, and 10C may select at least one of the writer number data and the recorded data to download the selected data from the server 20 based on an operation by a user.

Figure 5:
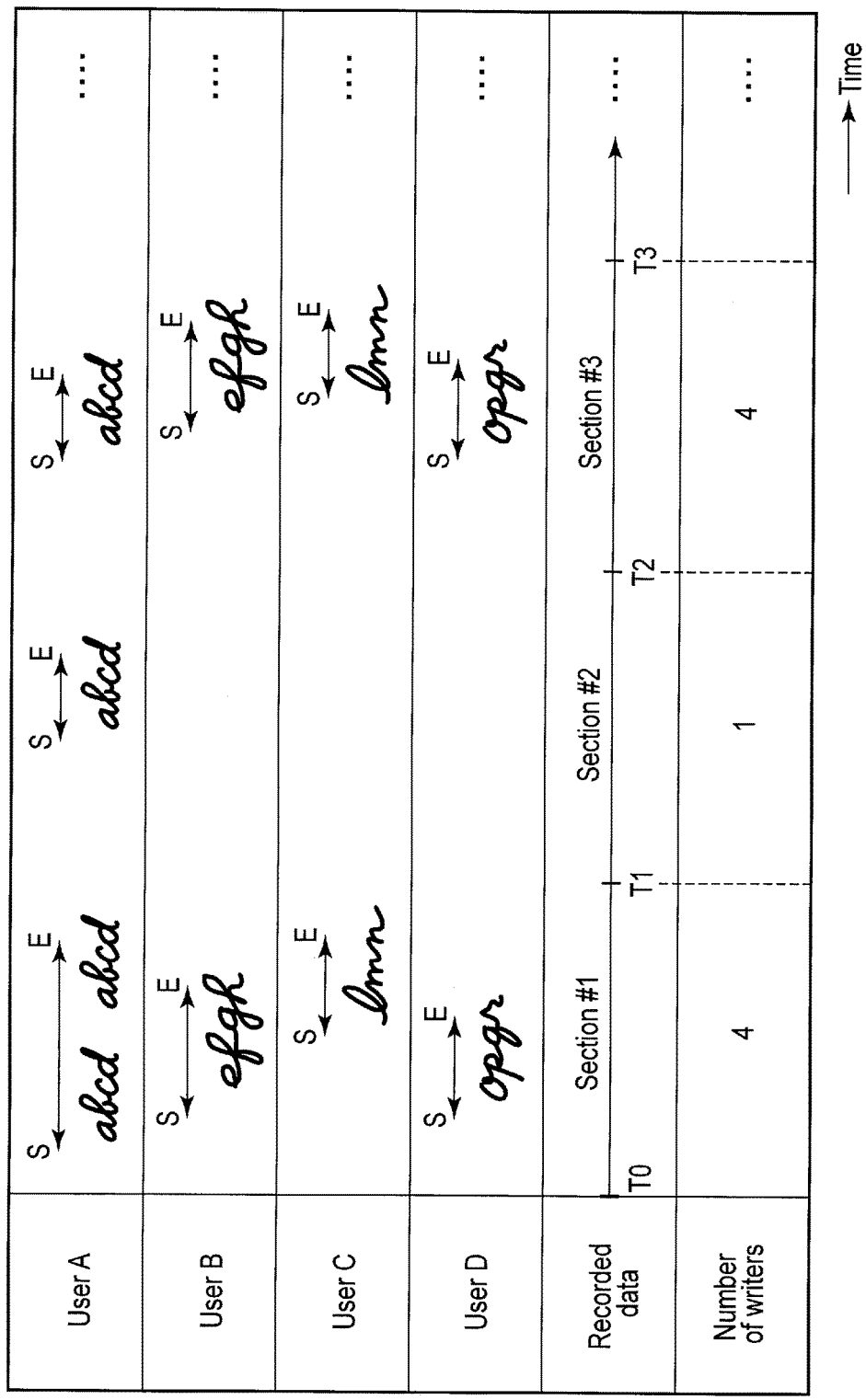
FIG. 5 is an exemplary diagram illustrating the relationship between recorded data (audio data) and handwriting inputs processed by the electronic device of FIG. 1.

FIG. 5 shows a relationship between the recorded data (audio data) and handwriting inputs by a plurality of users.

The recorded data include a plurality of sections (section #1, section #2, section #3 . . . ) each having a predetermined unit time length. The unit time length may be, for example, one minute. In FIG. 5, symbol S indicates an adjusted handwriting input start time. The adjusted handwriting input start time may indicate a specific point in time before an actual point in time at the start of the handwriting input. Symbol E indicates an adjusted current handwriting input end time. The adjusted current handwriting input end time may indicate a specific point in time before an actual point in time at the end of the current handwriting input.

The handwriting start time stamp in the handwriting input start event may indicate the adjusted handwriting input start time (S). If the handwriting start time stamp indicates the actual handwriting input start time, the value of the handwriting start time stamp may be corrected to the adjusted handwriting input start time (S) in the statistic calculation process for the number of writers.

The handwriting end time stamp in the handwriting input end event may indicate the adjusted current handwriting input end time (E). If the handwriting end time stamp indicates the actual handwriting input end time, the value of the handwriting end time stamp may be corrected to the adjusted current handwriting input end time (E) in the statistic calculation process for the number of writers.

In FIG. 5, an example where users A, B, C, and D perform the following handwriting inputs during recording is given.

In the statistic calculation process for the number of writers, the number of writers in section #1 of the recorded data, the number of writers in section #2 of the recorded data, the number of writers in section #3 of the recorded data, and thereafter are calculated based on the handwriting input start/end event from each device.

In the period corresponding to recording period of section #1 of the recorded data, user A of the electronic device 10A writes a handwritten character string "abcdabcd", user B of the electronic device 10B writes a handwritten character string "efgh", user C of the electronic device 10C writes a handwritten character string "lmn", and user D of the electronic device 10D writes a handwritten character string "opqr". Therefore, the number of writers in section #1 is determined to be four.

In the period corresponding to recording period of section #2 of the recorded data, user A of the electronic device 10A writes a handwritten character string "abcd" and users of the other electronic devices do not perform handwriting. Therefore, the number of writers in section #2 is determined to be one.

In the period corresponding to recording period of section #3 of the recorded data, user A of the electronic device 10A writes a handwritten character string "abcd", user B of the electronic device 10B writes a handwritten character string "efgh", user C of the electronic device 10C writes a handwritten character string "lmn", and user D of the electronic device 10D writes a handwritten character string "opqr". Therefore, the number of writers in section #3 is determined to be four.

FIG. 6 shows a recorded data view displayed by the tablet computer 10.

A recorded data view 21 is a screen which displays priority (importance) of each section in the recorded data in a visually identifiable manner.

For example, if the total time length of recorded data is an hour, the recorded data may be divided into sixty sections each having a one minute time length. Then, sixty objects corresponding to respective sixty sections are displayed on the recorded data view 21 in a display style corresponding to priority of respective sixty sections.

In the recorded data view in FIG. 6, the horizontal axis represents sixty sections in the recorded data chronologically and the vertical axis represents the priority (importance) of each section. Note that the vertical axis may show the number of writers.

In the recorded data view 21, sixty rod-shaped objects (sixty bins) are displayed in sixty display areas corresponding to the sixty sections, respectively. The length of each of sixty rod-shaped object represents the priority (importance) of the corresponding section. The priority (importance) of a section is determined based on the number of writers in the section, that is, the number of users who performs handwriting inputs in a period corresponding to the recording period of the section or the number of devices by which handwriting inputs are performed in the period corresponding to the recording period of the section. Therefore, the recorded data view 21 of FIG. 6 is a kind of histogram of the number of writers.

A user can easily understand the important parts (the number of writers) in the recorded data by referring to the recorded data view 21.

In the recorded data view 21, the sixty rod-shaped objects have the lengths corresponding to their priorities and also, the rod-shaped objects corresponding to sections in which the number of users who performs handwriting inputs or the number of devices by which handwriting inputs are performed is greater than or equal to a threshold value may be displayed in a specific color (such as red) which indicates high priority. Furthermore, the color of rod-shaped objects corresponding to sections in which the number of users who performs handwriting inputs or the number of devices by which handwriting inputs are performed is less than the threshold value may be a specific color (such as blue) which indicates normal priority.

The tablet computer 10 can generate a digest of the recorded data. The digest of the recorded data is a digest edition of the recorded data that is obtained by combining the important parts in the recorded data.

The tablet computer 10 extracts each of audio data parts 41 corresponding to several sections having high priority (high importance) from the recorded data. The audio data part corresponding to a section having high priority may be composed of an audio data part of one section having higher priority than a threshold value, for example. Or, the audio data part corresponding to a section having high priority may be composed of the audio data part corresponding to the section having high priority, an audio data part immediately before the audio data part, and an audio data part immediately after the audio data part.

Then, the tablet computer 10 creates a digest of the recorded data by combining the audio data parts 41 corresponding to several sections of high priority (high importance).

Note that the objects may be optionally displayed in such a manner that differences in the priority can be visually identified. For example, each object may be displayed in a color corresponding to its priority. In that case, objects corresponding to the sections of high priority and objects corresponding to the section s of normal priority may be displayed in different colors. Or, the priority may be classified into three priority levels of high priority, normal priority, and low priority, and objects corresponding to the section s of high priority, objects corresponding to the section s of normal priority, and objects corresponding to the section s of low priority may be displayed in different colors.

Furthermore, in the recorded data view 21, objects corresponding to all of the sections may be displayed, or only the objects corresponding to the sections of high priority (high importance) may be displayed in a display style corresponding to the high priority of the sections.

Figure 7:
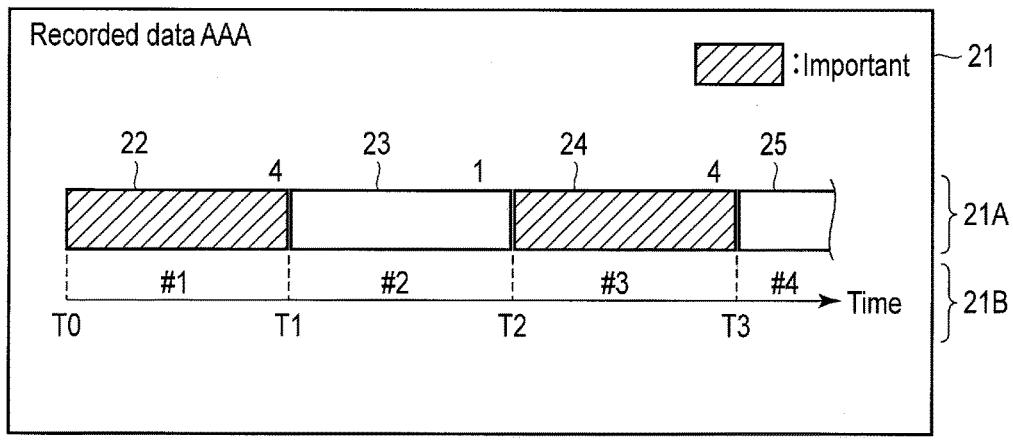
FIG. 7 is another example of recorded data view displayed by the electronic device of FIG. 1.

FIG. 7 shows another example of a recorded data view displayed by the tablet computer 10.

The recorded data view 21 of FIG. 7 includes a bar area 21A and a timeline display area 21B. The timeline display area 21B indicates a time axis of recorded data of a display target (recorded data name=AAA). In the timeline display area 21B, section between T0 and T1 corresponds to the first section (section #1) of the recorded data. Section between T1 and T2 corresponds to the second section (section #2) of the recorded data. Section between T2 and T3 corresponds to the third section (section #3) of the recorded data.

The bar area 21A displays bar-shaped objects 22, 23, 24, 25 and thereafter. The object 22 corresponds to section #1 and is displayed in a display area corresponding to section #1. The object 23 corresponds to section #2 and is displayed in a display area corresponding to section #2. The object 24 corresponds to section #3 and is displayed in a display area corresponding to section #3. The object 25 corresponds to section #4 and is displayed in a display area corresponding to section #4.

The objects 22, 23, 24, and 25 are displayed in such a manner that their priority (importance) in corresponding sections can be visually identified. For example, the objects corresponding to the sections of high priority having the number of writers more than a threshold value (such as objects 22 and 24 in sections #1 and #3) may be displayed in red. The objects corresponding to the sections of normal priority having the number of writers less than a threshold value (such as objects 23 and 25 in sections #2 and #4) may be displayed in blue. Or, the objects corresponding to the sections of high priority (such as objects 22 and 24) may be highlighted.

Furthermore, additional information such as the number of writers may be displayed near the objects 22, 23, 24, and 25, respectively.

Figure 8:
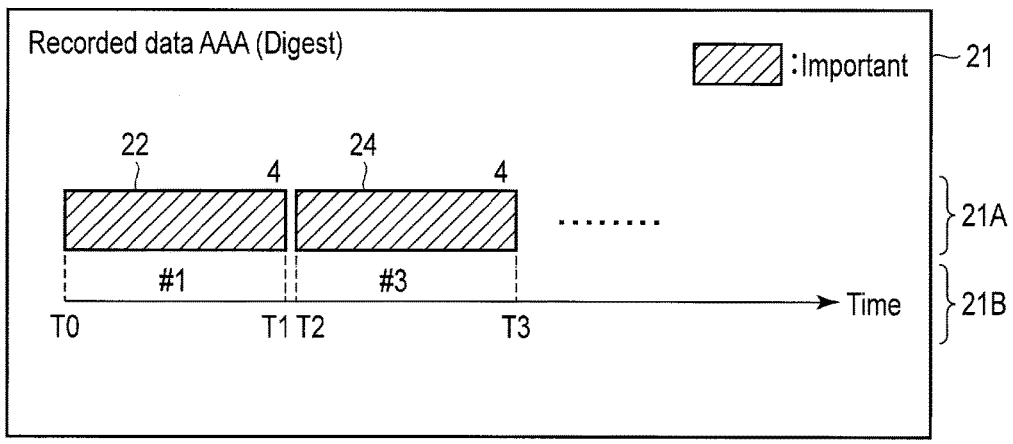
FIG. 8 is still another example of recorded data displayed by the electronic device of FIG. 1.

FIG. 8 shows still another example of a recorded data view displayed by the tablet computer 10.

In the recorded data view 21 of FIG. 8, a bar area 21A shows a digest structure of recorded data of a display target (recorded data name=AAA). That is, in the bar area 21A, only the objects corresponding to the sections of high priority (such as objects 22 and 24 in sections #1 and #3) are displayed in a display style corresponding to the priority (importance) of the sections. More specifically, sections #1 and #3 of high priority are extracted from the recorded data of the display target, and the object 22 corresponding to section #1 of high priority and the object 24 corresponding to section #3 of high priority are displayed to be adjacent to each other. The objects corresponding to the sections of normal priority (such as sections #2 and #4) are omitted from the display.

The objects 22 and 24 may be displayed in a color indicative of high priority (such as red). Or, the objects corresponding to the sections of high priority (such as objects 22 and 24) may be highlighted. Furthermore, the number of writers may be displayed near the objects 22 and 23, respectively.

Figure 9:
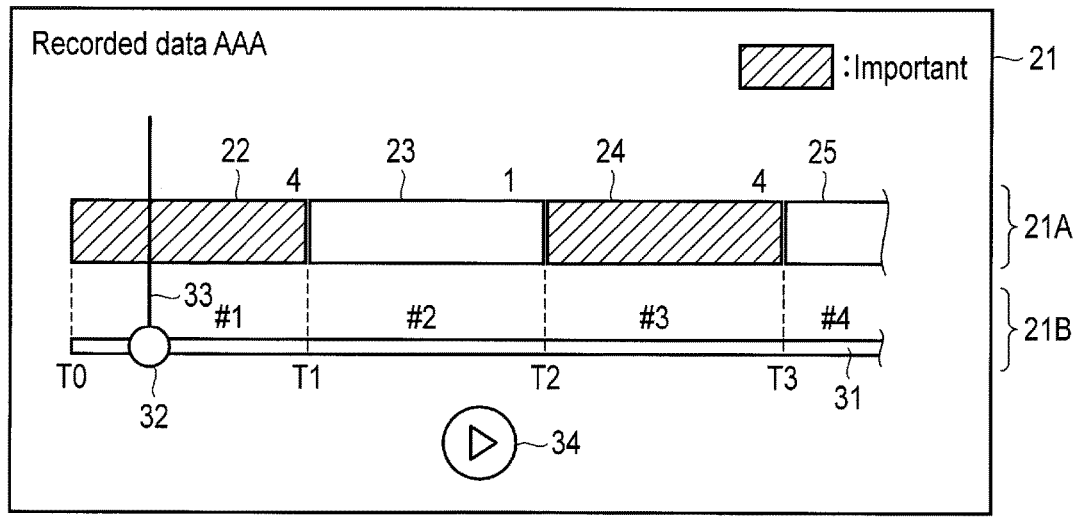
FIG. 9 is still another example of recorded data displayed by the electronic device of FIG. 1.

FIG. 9 shows still another example of a recorded data view displayed by the tablet computer 10.

The recorded data view 21 in FIG. 9 is used as a play view to control the playback of the recorded data (recorded data name=AAA).

In the timeline display area 21B, a seek bar 31 and a movable slider (locator) 32 are displayed. A total time from the start to the end of a sequence of recorded data is allocated to the seek bar 31.

A position of the slider 32 on the seek bar 31 indicates a position currently being played back. A vertical bar 33 extends upward from the slider 32. Since the vertical bar 33 crosses the bar area 21A, a user can easily understand in what section the position currently being played back is.

When a play button 34 is tapped by a user, playback of the recorded data is started. The slider 32 on the seek bar 31 moves to the right as the progress of the playback. The user can drag the slider 32 to the right or the left to change the position currently being played back to any optional position.

Figure 10:
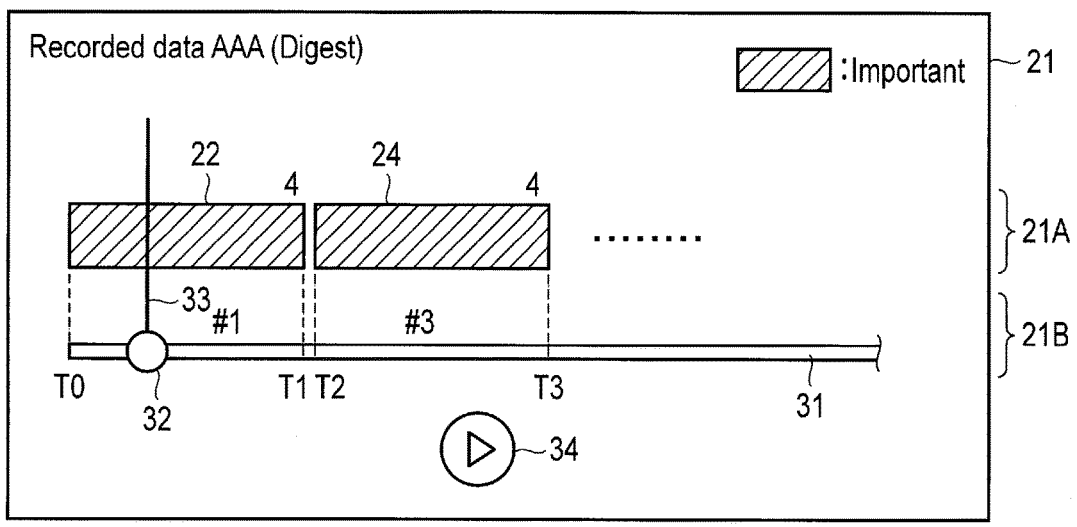
FIG. 10 is still another example of recorded data displayed by the electronic device of FIG. 1.

FIG. 10 shows still another example of a recorded data view displayed by the tablet computer 10.

The recorded data view 21 in FIG. 10 may be used as a play view to control the playback of a digest of the recorded data (recorded data name=AAA). That is, in the bar area 21A, only the objects corresponding to the sections of high priority (such as objects 22 and 24 in periods #1 and #3) are displayed in a display style corresponding to the priority (importance) of the sections. When the play button 34 is tapped by a user, playback of a digest of the recorded data is started. In that case, the audio data part in section #1 (between T0 and T1) is played back first. After the audio data part of section #1 is played back completely, play back of the audio data part of section #3 (between T2 and T3) is started by automatically skipping the audio data part of section #2 (between T1 and T2).

Figure 11:
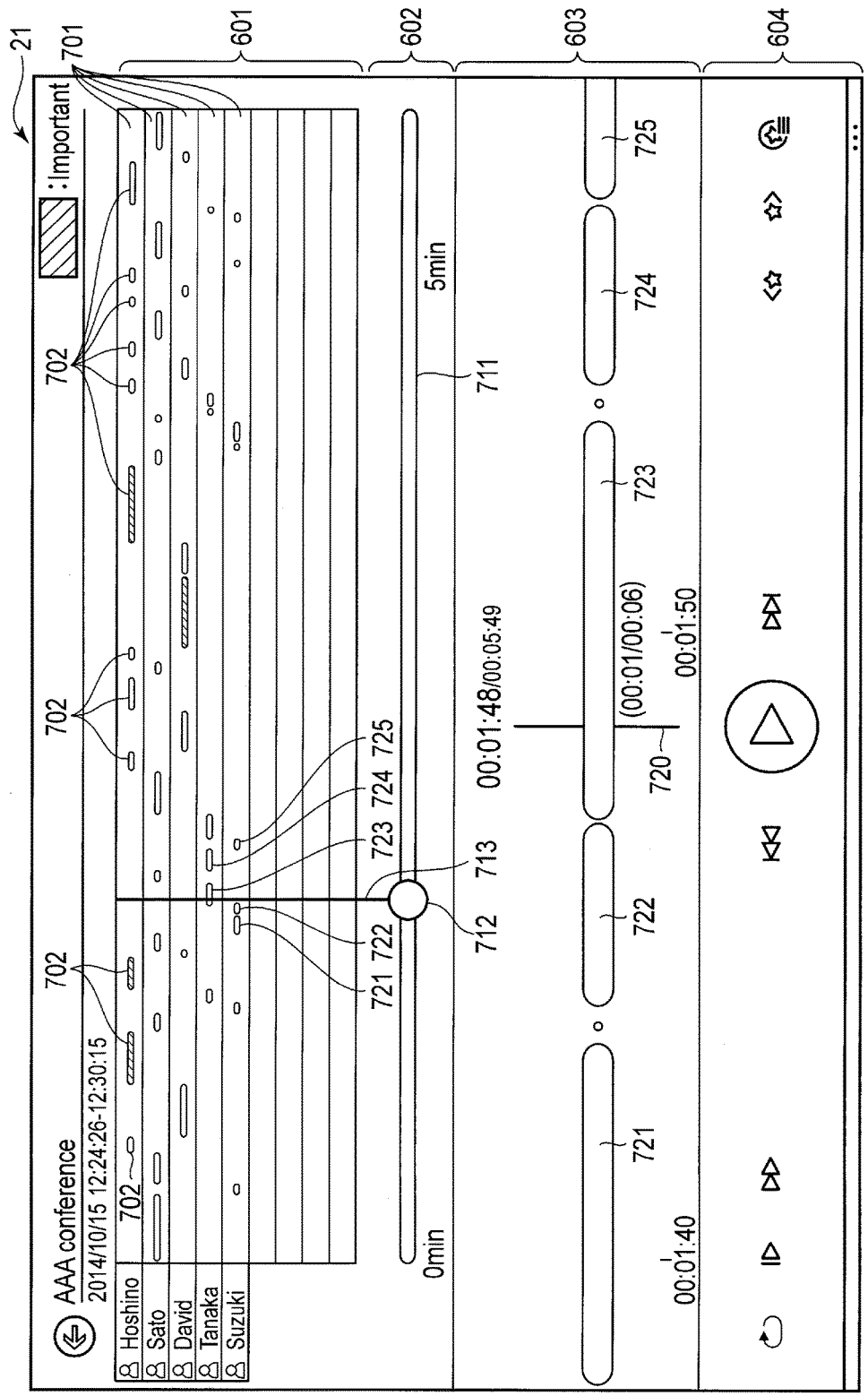
FIG. 11 is still another example of recorded data displayed by the electronic device of FIG. 1.

FIG. 11 shows still another example of a recorded data view displayed by the tablet computer 10.

The recorded data view 21 in FIG. 11 is used as a play view to control the playback of the recorded data (recorded data name=AAA).

The recorded data view 21 displays a speaker identification result view area 601, seek bar area 602, play view area 603, and control panel 604.

The speaker identification result view area 601 displays the whole sequence of the recorded data selected by a user (here, recorded data entitled "AAA conference"). The speaker identification result view area 601 may display a plurality of time bars (timelines) 701 corresponding to respective speakers in the sequences of the recorded data. In that case, if there are five speakers in the sequences of the recorded data, five time bars 701 are displayed to correspond to the five speakers, respectively.

The handwriting collaboration engine of the tablet computer 10 can recognize ten speakers per one recording at the maximum and can display ten time bars 701 at the maximum.

The identification of the speakers is performed using a speaker clustering engine included in the tablet computer 10.

The speaker clustering engine performs a speaker identification process by analyzing the audio data. The speaker identification process detects what speaker speaks when. The speaker clustering engine performs the speaker identification process for each sound data unit (a collection of 0.5 second sound data samples). Although no limitation is intended, the speaker identification process may include speech detection and speaker clustering. The speech detection detects whether each sound data unit is a speech (human voice) section or a non-speech section (noise section and silent section) other than the speech section. The speech detection process may be realized by voice activity detection (VAD), for example. The speech detection process may be performed in real time during sound recording.

In the speaker clustering, it is identified which speaker's speech included in the sequence of the audio data corresponds to each speech section included in the sequence. That is, the speaker clustering classifies speech sections into a plurality of clusters corresponding to the speakers in the audio data. Each cluster is a collection of sound data units of the same speaker.

To perform speaker clustering, various kinds of methods can be used. In the present embodiment, although no limitation is intended, both a method to perform speaker clustering using speaker positions and a method to perform speaker clustering using speech characteristics (sound characteristics) may be used.

The speaker positions indicate positions of speakers with respect to the tablet computer 10. The speaker positions can be estimated based on a difference between two sound signals input through two microphones 12L and 12R. Speeches input from the same speaker position can be estimated the speeches from the single speaker.

In the method to perform speaker clustering using the speech characteristics, sound data units having similar characteristics are classified to the same cluster (same speaker). The speaker clustering engine extracts characteristics such as Mel frequency cepstrum coefficient (MFCC) from each of the sound data units determined to be speech. The speaker clustering engine can perform speaker clustering using not only the speaker positions but also the characteristics of each of the sound data units.

In the speaker identification result view area 601, five speakers are arranged in order of amount of speeches in the whole sequences of the recorded data in the AAA conference. The speaker who spoke most frequently in the whole sequence is displayed on the top of the speaker identification result view area 601.

Each time bar 701 is a display area having its longitudinal in the time axis direction (here in the horizontal direction). The left end of each time bar 701 corresponds to the start time of the sequence in the recorded data, and the right end of each time bar 701 corresponds to the end time of the sequence in the recorded data. That is, the total time from the start to the end of the sequence in the recorded data is allocated to each time bar 701.

In FIG. 11, speaker names (Hoshino, Sato, David, Tanaka, and Suzuki) are displayed adjacent to human silhouette icons, and the speaker names are data added by an edit operation by a user. In the initial state where no edit operation is made by a user, the speaker names are not displayed. Or, in the initial state, symbols such as A, B, C, and D may be displayed adjacent to the human silhouette icons instead of the names.

In a time bar 701 of a speaker, a speech section bar indicative of positions and time length of each speech section by the speaker is displayed.

Furthermore, each speech section bar is displayed in a display style corresponding to the priority (the number of writers) of the corresponding speech section. For example, the speech section bar corresponding to speech section of high priority having the number of writers more than a threshold value may be displayed in red (hatched in FIG. 11) indicative of the speech section of high priority.

As above, in FIG. 11, objects (speech section bars) are displayed in a display area corresponding to respective speech sections and the objects (speech period bars) are displayed in display styles corresponding to the priorities (the number of writers) of the speech sections.

For example, if several speech sections are included in one minute period having the number of writers more than a threshold value, the speech sections are displayed in red indicative of the speech section of high priority. If several speech sections are included in one minute period having the number of writers less than a threshold value, the speech sections are displayed in blue indicative of the speech section of normal priority.

In the seek bar area 602, a seek bar 711 and a movable slider (locator) 712 are displayed. The total time from the start to the end of the sequence of recorded data is allocated to the seek bar 711. A position of the slider 712 on the seek bar 711 indicates a position currently being played back. A vertical bar 713 extends upward from the slider 712. The vertical bar 713 crosses the speaker identification result view area 601, which enables the user to easily understand which speech segment of a speaker (main speaker) the current playback location is.

Furthermore, if a user taps an optional position on the time bar 701 corresponding to an optional speaker, a position currently being played back can be changed to a position corresponding to the tapped position. For example, if a position on a time bar 701 is tapped, the position currently being played back may be changed to the tapped position. Thus, a user can easily listen to only the speech section of high priority (the number of writers).

If a user taps the speech sections (speech section bars) of a specific speaker in order, the user can listen to the speech sections of the specific speaker one by one.

The play view area 603 is an enlarged view of a period near the position currently being played back (for example a period of approximately twenty seconds). The play view area 603 includes a display area whose length is in the time axis direction (here in the horizontal direction). In the play view area 603, several speech sections (actual speech sections detected) included in the period near the position currently being played back in chronological order. The vertical bar 720 indicates the position currently being played back.

The vertical bar 720 is displayed in the center between the right end and the left end of the play view area 603. The position of the vertical bar 720 is fixed. As the playback progresses, the display content of the play view area 603 is scrolled from the right to the left. That is, several speech section bars on the play view area 603, in this example, speech section bars 721, 722, 723, 724, and 725 are move from the right to the left as the playback progresses.

If a user performs a flick on the play view area 603, the display content of the play view area 603 is scrolled to right or left while the position of the vertical bar 720 is fixed. As a result, the positioned currently being played back is changed.

Now, a stroke input by handwriting will be explained with reference to FIG. 12.

Figure 12:
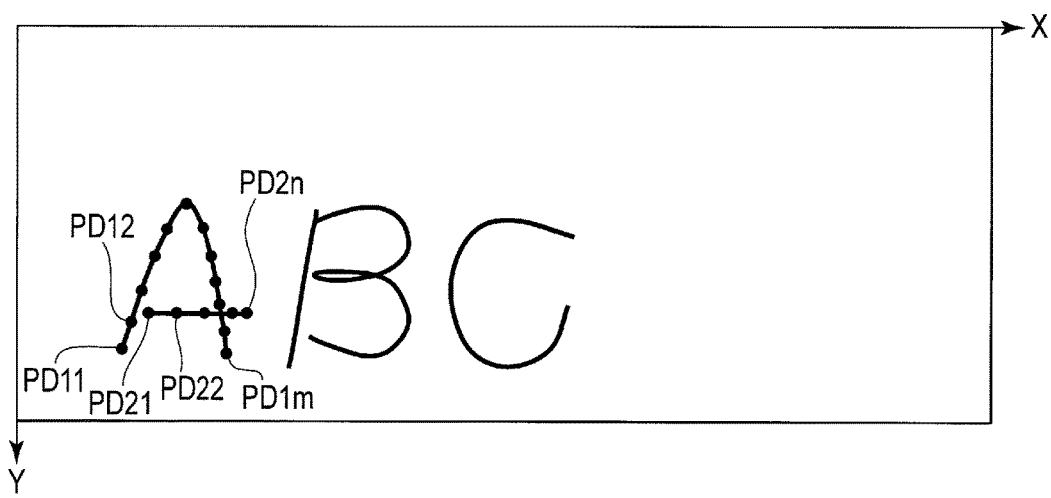
FIG. 12 is an illustration showing an example of a handwritten document which is handwritten on a touch screen display of the electronic device of FIG. 1.

In FIG. 12, an example where a handwritten character string of "ABC" are handwritten in the order of "A", "B", and "C" is given.

The handwritten character "A" is represented by two strokes (a locus shaped like "Λ" and a locus shaped like "-") handwritten by a pen 100 or the like.

While the pen 100 is moved, the locus shaped like "Λ" drawn by the pen 100 is sampled in real time. Thereby, a plurality of data points (a plurality of coordinate data) PD11, PD12, . . . , PD1m are obtained sequentially corresponding to respective points on the locus of the pen 100 drawing the "Λ" shape. For example, a data point indicative of a new position may be obtained every time the position of the pen 100 on the screen moves a certain amount. In FIG. 12, the density of data points is low for the sake of simplification, and in the actual case, data points can be obtained at a higher density. The data points PD11, PD12, . . . , PD1m are used for drawing the locus of the pen 100 drawing "Λ" on the screen. While tracing the movement of the pen 100, the locus of the pen 100 that is drawing "Λ" is drawn on the screen in real time.

Similarly, the locus of the pen 100 that is drawing "-" is sampled in real time while the pen 100 is moved. Thereby, a plurality of data points (a plurality of coordinate data) PD21, PD22, . . . , PD2n are obtained sequentially corresponding to respective points on the locus of the pen 100 that is drawing the "-" shape.

The handwritten character "B" is represented by two strokes handwritten by the pen 100 or the like. The handwritten character "C" is represented by one stroke handwritten by the pen 100 or the like.

FIG. 13 shows time series data 200 corresponding to the handwritten character strings in FIG. 12. The time series data 200 includes a plurality of stroke data SD1, SD2, . . . , SD7. In the time series data 200, the stroke data SD1, SD2, . . . , SD7 are arranged in the order of handwriting, that is, the chronological order in which the strokes have been handwritten.

In the time series data 200, two initial stroke data SD1 and SD2 represent two strokes constituting the handwritten character "Λ". Third and fourth stroke data SD3 and SD4 represent two strokes constituting the handwritten character "B". Fifth stroke data SD5 represents one stroke constituting the handwritten character "C". Sixth and seventh stroke data SD6 and SD7 represent two strokes constituting the handwritten arrow.

Each stroke data includes a plurality of coordinates corresponding to respective points on a locus of one stroke. In each stroke data, the coordinates are arranged in the chronological order in which the handwritten strokes have been written. For example, as to the handwritten character "Λ", stroke data SD1 includes a coordinate data series (time series coordinate) corresponding to respective points on the locus of the stroke drawing the "Λ" shape of the handwritten character "Λ", that is, n coordinate data SD 11, SD12, . . . , SD1n. Stroke data SD2 includes a coordinate data series corresponding to respective points on the locus of the stroke drawing "-" shape of the handwritten character "Λ", that is, n coordinate data SD21, SD22, . . . , SD2n. Note that the number of coordinate data may vary within each respective stroke data.

Each coordinate data indicate x and y coordinates corresponding to one point in a corresponding locus. For example, coordinate data SD11 indicates x coordinate (X11) and y coordinate (Y11) of a start point of the stroke shaped like "Λ". Coordinate data in indicates x coordinate (X1n) and y coordinate (Y1n) of an end point of the stroke shaped like "Λ".

Furthermore, each coordinate data may include time stamp information T corresponding to a point in time when the point corresponding to the coordinate is handwritten. The point in time of handwriting may be either an absolute time (such as year, month, date, hour, minute and second) or a relative time with reference to a certain standard time. For example, an absolute time (such as year, month, date, hour, minute and second) when the stroke is started may be added to each stroke data as time stamp information and a relative time which indicates a difference from the absolute time may be added to each coordinate data in the stroke data as time stamp information T.

Furthermore, information indicative of a pressure of writing (Z) may be added to each coordinate data.

FIG. 14 shows a system structure of the tablet computer 10.

As shown in FIG. 14, the tablet computer 10 comprises a CPU 101, system controller 102, main memory 103, graphics controller 104, sound controller 105, BIOS-ROM 106, nonvolatile memory 107, EEPROM 108, LAN controller 109, wireless communication device 110, vibrator 111, acceleration sensor 112, audio signal converter 113, and embedded controller (EC) 114, for example.

The CPU 101 is a processor configured to control the operation of components in the tablet computer 10. The processor includes circuitry (process circuitry). The CPU 101 executes various programs loaded from the nonvolatile memory 107 to the main memory 103. The programs include an operating system (OS) 201 and various application programs. The application programs include a handwriting application program 202.

The handwriting application program 202 has several features.

The handwriting application program 202 is a digital notebook application by which notes can be taken. The handwriting application program 202 includes the function to prepare and display a handwritten document as described above, along with a function to edit a handwritten document and the above mentioned handwriting collaboration engine. Each function of the handwriting application program 202 can be achieved by a circuit or a programmed processor.

Furthermore, the CPU 101 executes a basic input/output system (BIOS) stored in the BIOS-ROM 106. The BIOS is a program used to control hardware.

The system controller 102 is a device to connect between a local bus of the CPU 101 and the various components. The system controller 102 includes a memory controller used for access control of the main memory 103. Furthermore, the system controller 102 has a function to execute communication with the graphics controller 104 via a serial bus of PCI EXPRESS standard.

The system controller 102 further includes an ATA controller used to control the nonvolatile memory 107. The system controller 102 further includes an USB controller to control various USB devices. The system controller 102 further has a function to execute communication with each of the sound controller 105 and the audio signal converter 113.

The graphics controller 104 is a display controller to control an LCD 17A of the touch screen display 17. The display controller includes circuitry (display control circuitry). Display signals generated by the graphics controller 104 are sent to the LCD 17A. The LCD 17A displays a screen image based on the display signals. A touch panel 17B covers the LCD 17A and functions as a sensor to detect a contact position between the screen of the LCD 17A and an external object. The sound controller 105 is a sound device. The sound controller 105 converts the audio data of a playback target into analog signals and supplies the analog signals to the audio speakers 13R and 13L.

The LAN controller 109 is a wired communication device configured to execute wired communication of IEEE 802.3 standard, for example. The LAN controller 109 includes a transmitting circuit configured to transmit signals and a receiving circuit configured to receive signals. The wireless communication device 110 is a wireless communication device configured to execute wireless communication of IEEE 802.11 standard, for example. The wireless communication device 110 includes a transmitting circuit configured to transmit signals wirelessly and a receiving circuit configured to receive signals wirelessly.

The vibrator 111 is a device to generate vibration. The acceleration sensor 112 is used to detect a current orientation of the main body 11 (portrait orientation or landscape orientation).

The audio signal converter 113 performs analog/digital conversion of the sound input through the microphones 12R and 12L and outputs the digital signals corresponding to the input sound.

The EC 114 is a one-chip microcomputer including an embedded controller for power management. The EC 114 has a function to turn on/off the power of the tablet computer 10 based on a power button operation by a user.

FIG. 15 shows a functional structure of the handwriting application program 202.

The handwriting application program 202 includes instructions for configuring the CPU 101 to function as a handwriting input interface 300, display process module 301, stroke data generator 302, and process module 305, for example.

The handwriting application program 202 creates, displays and edits handwritten page data by using stroke data that is input using the touch screen display 17. The touch panel 17B of the touch screen display 17 is configured to detect events such as "touch", "movement (slide)", and "release". "Touch" is an event indicating that a pen touches the screen. The "move (slide)" is an event indicating that, while the pen is in contact with the screen, the contact position between the pen and the screen moves. The "release" is an event indicating that the pen is lifted from the screen.

The handwriting input interface 300 is an interface configured to perform a handwriting input in conjuncture with the touch panel 17B of the touch screen display 17. The handwriting input interface 300 receives an event of "touch" or "movement (slide)" from the touch panel 17B of the touch screen display 17 and detects a handwriting input operation based on the received event. The "touch" event includes coordinates of the contact position. The "movement (slide)" event includes coordinates of the contact position after the movement. Therefore, the handwriting input interface 300 can receive a coordinate string corresponding to a locus of the movement of the contact position.

The display process module 301 receives a series of the coordinates from the handwriting input interface 300, and displays on the screen of the LCD 17A strokes handwritten by the handwriting input operation using the pen 100, based on the series of the coordinates. Furthermore, the display process module 301 displays the stroke data received from the other devices on the screen of the LCD 17A under the control of the process module 305.

The stroke data generator 302 receives the series of the coordinates from the handwriting input interface 300, and generates time series data having the structure as specified with reference to FIG. 13, based on the series of the coordinates. In this case, the time series data may be stored in a stroke database 52.

The process module 305 executes various processes corresponding to the handwriting collaboration engine described above. The process module 305 includes a communication process module 311, recording process module 312, recording digest creation module 313, and playback process module 314, for example.

The communication process module 311 transmits a handwriting input start/end event to the other devices or the server 20 through a transmitter 110A of the wireless communication device 110. Furthermore, the communication process module 311 executes a process for receiving a handwriting input start/end event from the other devices through a receiver 110B of the wireless communication device 110, or a process for receiving a writer number data from the server 20 through the receiver 110B of the wireless communication device 110.

The recording process module 312 records audio data corresponding to sound input through the microphones 12L and 12R and the audio signal converter 113 in the nonvolatile memory 107. The recording process module 312 can perform recording in various scenes such as conference, lecture, and presentation.

The recording digest creation module 313 creates a digest of recorded data by extracting the audio data parts corresponding to the high priority sections from the recorded data.

The playback process module 314 executes a process for displaying the above recorded data view using the writer number data corresponding to some recorded data. The playback process module 314 may calculate the number of writers in each section in the recorded data, based on the handwriting input start/end events that are transmitted and received during recording, or may receive the wrier number data from the server 20.

An example where the recorded data (audio data) includes a first section and a second section and priority of the first section is higher than that of the second section is now given.

The priority of the first section is determined based on the number of users who performs handwriting inputs in a first period corresponding to a recording period in the first section or the number of devices by which handwriting inputs are performed in the first period. The priority of the second period is determined based on the number of users who performs handwriting inputs in a second period corresponding to a recording period in the second section or the number of devices by which handwriting inputs are performed in the second section. The playback process module 314 executes a process for displaying at least a first object corresponding to the first section in a display style corresponding to the priority (high priority) of the first section. In this case, the playback process module 314 may display the first object corresponding to the first section (high priority section) and a second object corresponding to the second section (normal priority section) in different display styles (such as different colors) as explained above with reference to FIGS. 7 and 9. Or, only the first object corresponding to the first section (high priority section) may be displayed in a display style corresponding to the high priority (such as red) as explained above with reference to FIGS. 8 and 10.

Figure 16:
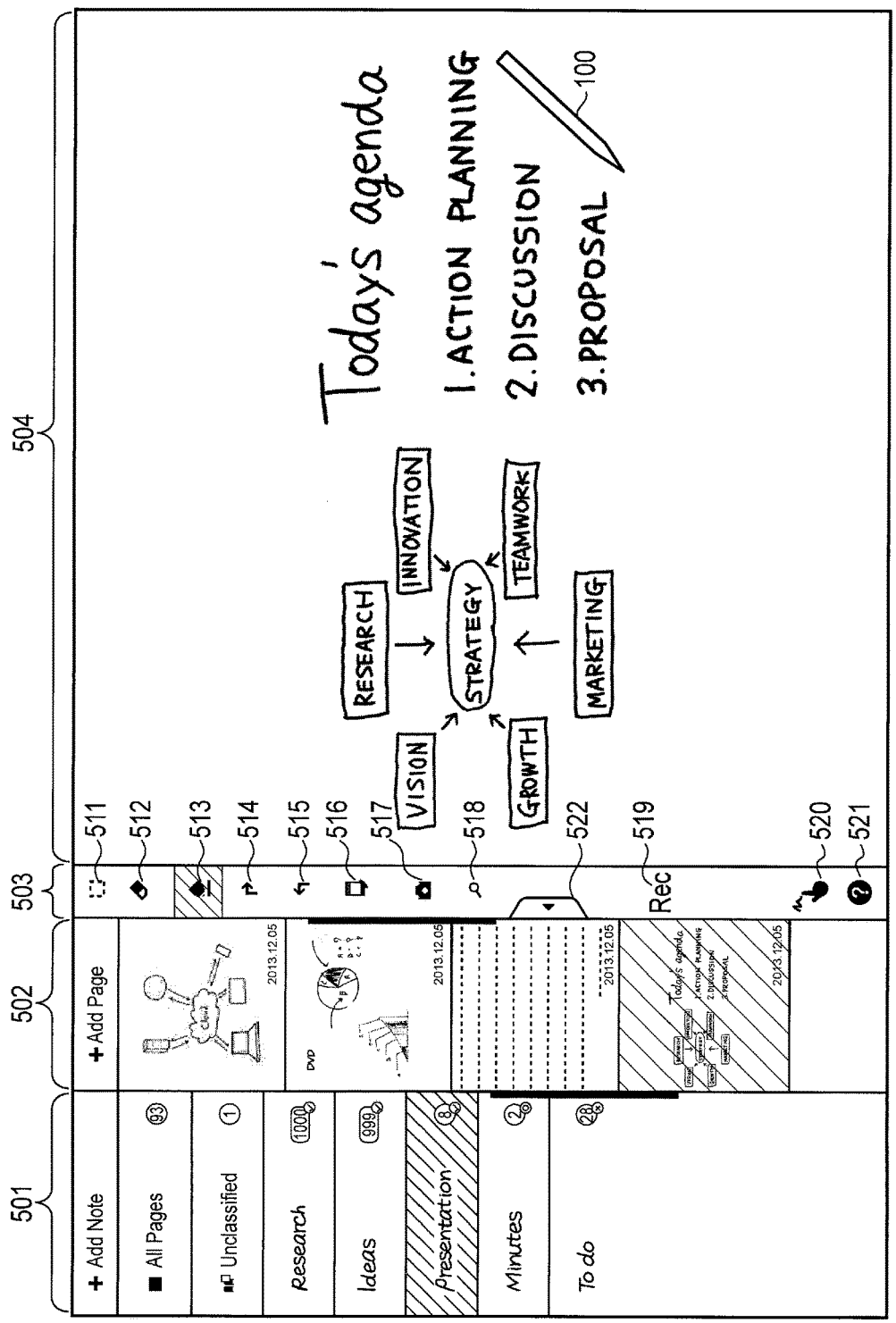
FIG. 16 is an exemplary view illustrating an example of a user interface (edit screen) displayed by the electronic device of FIG. 1.

FIG. 16 indicates a user interface (edit screen) of the handwriting application program 202.

The edit screen includes four areas, that is, a notebook list 501, page list 502, edit toolbar 503, and edit view area 504.

The notebook list 501 indicates a list of notebooks managed by the handwriting application program 202. Two icons "Add Note" and "All Pages" near the upper end of the notebook list 501 are command icons. When the "Add Note" icon is tapped by a user, the process module 305 executes a process to add a new notebook. When the "All Pages" icon is tapped by a user, the process module 305 executes a process to display a list of thumbnails corresponding to all pages in all the notebooks.

Icon "Unclassified pages" is a notebook icon which indicates a notebook including a page group not belonging to any notebook of the user. Icon "Research" is a notebook icon which indicates a notebook (entitled "Research") of the user. Icon "Ideas" is a notebook icon which indicates a notebook (entitled "Ideas") of the user. Icon "Presentation" is a notebook icon which indicates a notebook (entitled "Presentation") of the user. Icon "Minutes" is a notebook icon which indicates a notebook (entitled "Minutes") of the user. Icon "ToDo" is a notebook icon which indicates a notebook (entitled "ToDo") of the user.

The notebook icons can be rearranged by a drag and drop operation.

The page list 502 indicates a list of thumbnails corresponding to pages in the notebook corresponding to the notebook icon currently being selected.

The top icon "Add Page" in the page list 502 is a command icon. When the "Add Page" icon is tapped by the user, the process module 308 executes a process to add a new page to the notebook being edited.

A plurality of page icons are arranged at the lower side of the "Add Page" icon and the page icons indicate thumbnails corresponding to a plurality of pages. Strokes in the page corresponding to the selected page icon are displayed in the edit view area 504. If the user selects a desired page icon in the page list 502, a desired page can be displayed on the edit view area 504.

The page icons can be rearranged by a drag and drop operation. If the user drags and drops the page icons, the order of pages can be changed (customized).

The edit toolbar 503 includes several buttons to edit the pages. A "selection pen" button 511 is used as a "range selection" tool. The user can select one or more objects on the edit view area 504 by the "selection pen". When the "selection pen" button 511 is tapped by the user, the process module 308 displays a menu to change selection type (rectangle/free frame/select all).

An "eraser pen" button 512 is used as an "eraser" tool. The user can erase one or more strokes on the edit view area 504 using the "eraser pen". When the "eraser pen" button 512 is tapped by the user, the process module 308 displays a menu to change a size of eraser (large/small/erase all).

A "stroke input pen" button 513 is used to draw strokes. The user can draw handwriting (strokes) on the edit view area 504 by the "stroke input pen". When the "stroke input pen" button 513 is tapped by the user, process module 305 displays a menu for representing preset pens. Each of preset pens defines a combination of a pen type (fountain pen/pencil/ballpoint pen/pencil/marker/felt pen), width, color, transparency. The user can select a pen from this menu.

An "undo" button 515 is used to undo an edit operation. A "redo" button 514 is used to redo an edit operation.

An "auto complete (recommendation input)" button 516 is a button to turn on/turn off an auto complete mode. If the auto complete mode is turned on, a list of handwriting candidates corresponding to the stroke (temporary stroke) input by handwriting is displayed on the edit view area 504 as input candidates.

A "camera" button 517 is used to take a picture and to import the picture into the edit view area 504. The user can take a picture using the "camera" button 517. The process module 308 activates a capture application program. The capture application program captures an image (picture) by the camera (Web cam) provided with the tablet computer 10. The process module 308 imports the captured image.

A "Search" button 518 is a button to open an input window in which search terms can be entered. A "Rec" button 519 is a button to instruct an execution of recording. When the "Rec" button 519 is tapped by a pen or a finger, the process module 305 starts a recording process.

A "touch input mode" button 520 is a button to turn on/turn off a touch input mode which allows drawing by a finger or a mouse.

A "help" button 520 is a button to display a help. A tab button 522 is a button to switch between a normal mode and a full screen mode. FIG. 16 shows the edit screen corresponding to the normal mode.

The edit view area 504 is an input area which can accept a handwriting input. The user can handwrite strokes on a desired part in the edit view area 504.

Figure 17:
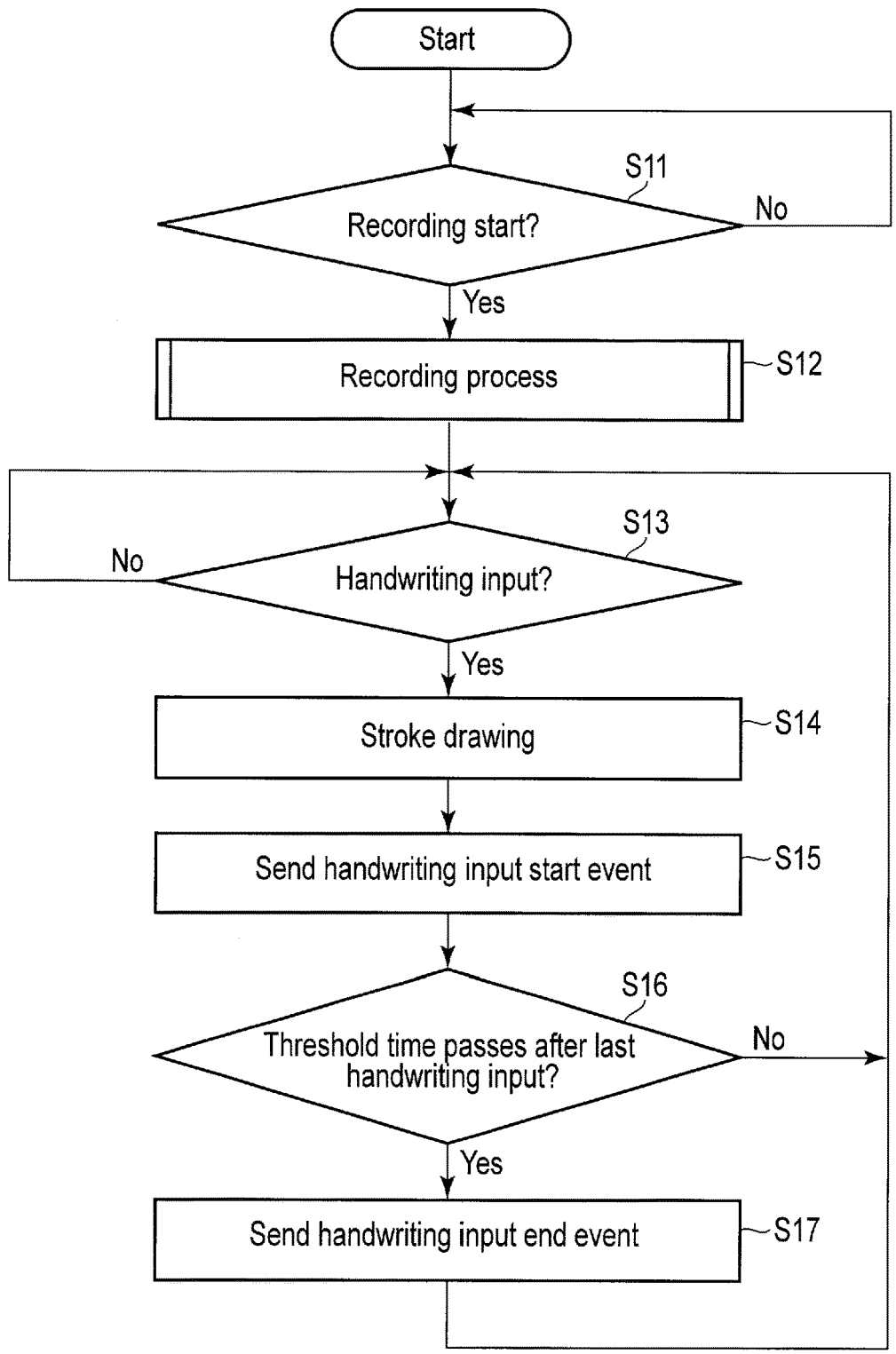
FIG. 17 is an exemplary flowchart illustrating a process executed by the electronic device of FIG. 1 during recording.

FIG. 17 shows a flowchart of a process executed by the tablet computer 10 during recording.

The CPU 101 of the tablet computer 10 determines whether or not the "Rec" button 519 is tapped by a user (step S11). If the "Rec" button 519 is tapped by the user (YES in step S11), the CPU 101 starts recording (step S13).

The CPU 101 determines whether or not a handwriting input is performed during recording (step S13). If a handwriting input is performed during recording (YES in step S13), the CPU 101 executes a process to draw strokes on the edit screen (page), that is, a process to display the strokes made by the handwriting input on the screen (step S14) and transmits a handwriting input start event to the other devices or a server alone (step S15).

The CPU 101 determines whether or not a threshold time has passed after the last handwriting input (step S16). If a threshold time has passed after the last handwriting input (YES in step S16), the CPU 101 transmits a handwriting input end event to the other devices or the server alone (step S17).

If a handwriting input start/end event is received from the other devices during recording, the CPU 101 stores the handwriting input start/end event.

Figure 18:
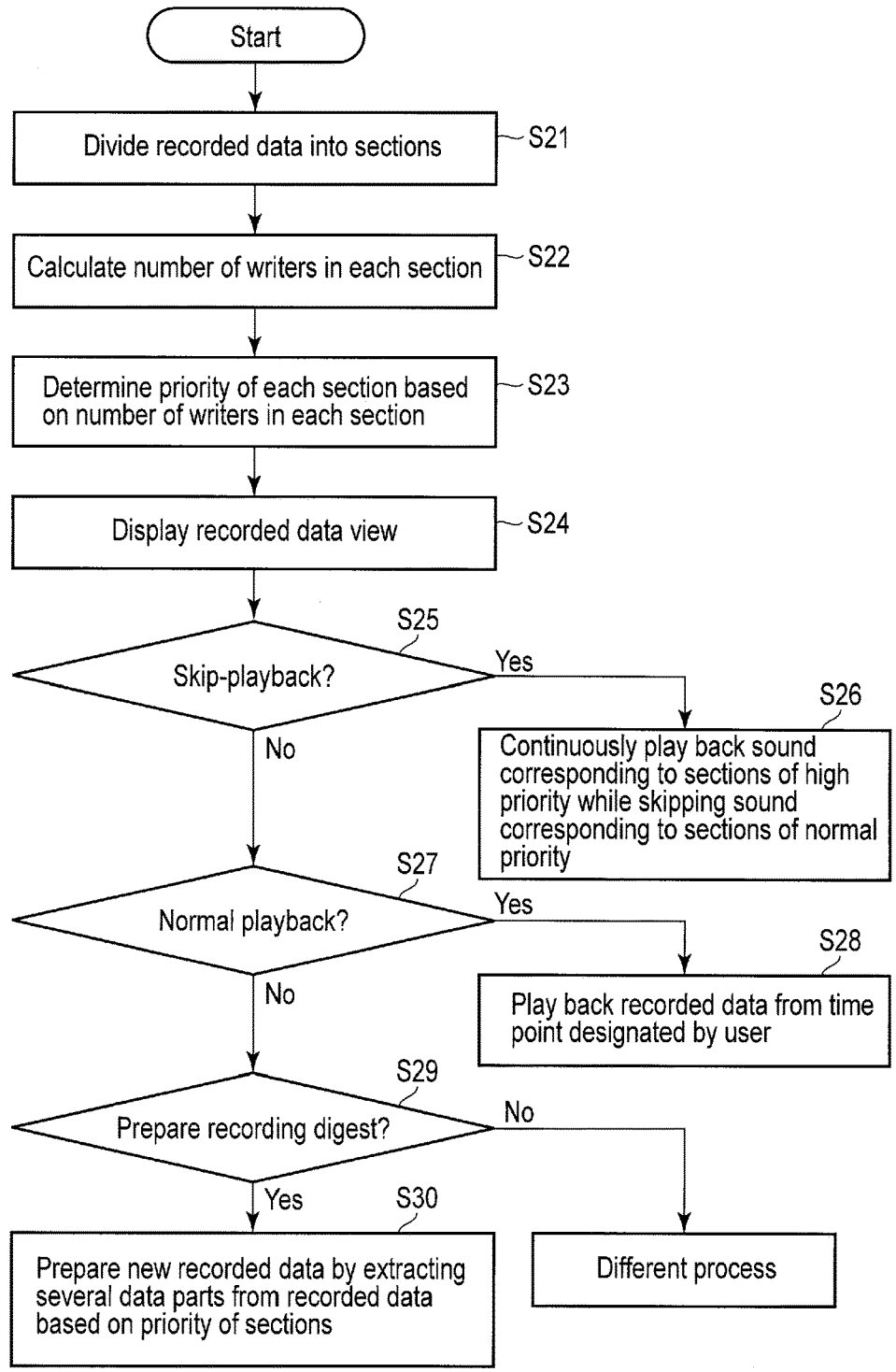
FIG. 18 is an exemplary flowchart illustrating a recorded data view display process executed by the electronic device of FIG. 1.

FIG. 18 shows a flowchart of a recorded data view display process.

The CPU 101 divides audio data (recorded data) into a plurality of sections (step S21). Then, the CPU 101 calculates, based on the handwriting input start/end events of all the devices including the tablet computer 10, the number of writers in each respective section (the number of users who performs handwriting inputs or the number of devices by which handwriting inputs are performed) (step S22). Note that the CPU 101 may receive the writer number data which indicate the number of writers of each respective section from the server.

The CPU 101 determines priorities of the sections based on the number of writers in each of the sections in the recorded data (step S23). Then, the CPU 101 displays a recorded data view on the screen (step S24). In the recorded data view, at least objects corresponding to sections of high priority are displayed. Each of the objects is displayed in a style corresponding to the number of writers in the section.

If playback of the recorded data is requested by the user, the CPU 101 plays back the recorded data. The playback mode of the recorded data includes a skip-playback mode and a normal playback mode.

If the skip-playback mode is selected by the user (YES in step S25), the CPU 101 continuously plays back the sound (audio data parts) corresponding to sections of high priority while skipping the sound (audio data parts) of normal priority (step S25).

If the normal playback mode is selected by the user (YES in step S27), the CPU 101 plays back the recorded data from a time point (playback position) designated by a user input (step S28).

If creation of a recording digest is selected by the user (YES in step S29), the CPU 101 extracts several audio data parts from the recorded data based on the priority of the sections in the recorded data, and combines the audio data parts to create a new recorded data (a digest of the recorded data) (step S30). In step S30, only the audio data parts corresponding to the sections of high priority may be extracted. In the process to extract the audio data parts, audio data parts to be extracted may be determined in consideration of speech section. Thereby, cutting a single speech section in the middle can be prevented.

Furthermore, in step S30, the CPU 101 may display on a screen a user interface (FIG. 19) used for the user to designate a time length of a digest to be created. Then, the CPU 101 creates, based on the time length designated by the user and the priority of each section in the recorded data, a digest of the audio data having a time length fitting in the time length designated by the user.

As explained above, in the present embodiment, if the priority of the first section of the audio data is higher than that of the second section, a process for displaying at least first object corresponding to the first section on the screen is executed. In that case, the first object is displayed in a display style corresponding to the priority of the first section. The priority of the first section is determined based on the number of writers in the first section, that is, the number of users who performs handwriting inputs in a first period corresponding to the recording period of the first section or the number of devices by which handwriting inputs are performed in the first period. The priority of the second section is determined based on the number of writers in the second section, that is, the number of users who performs handwriting inputs in a second period corresponding to the recording period of the second period or the number of devices by which handwriting inputs are performed in the second period. Therefore, the high priority sections in the audio data can be presented to the user.

Furthermore, in the present embodiment, the priority of each section in the audio data is determined using the user behavior of taking a handwriting note immediately after the speech considered important. Therefore, prioritization can be performed with high objectivity.

Note that various functions described in the present embodiment may be achieved by circuitry (process circuitry). The process circuitry may be a programmed processor such as central processing unit (CPU). The processor executes the functions described above by executing computer programs (instructions). The processor may be a microprocessor including electric circuits. The process circuitry may be a digital signal processor (DSP), application specific integrated circuit (ASIC), microcontroller, controller, or any other electric circuit component. Each of the components described in the present embodiment other than CPU may be realized as process circuitry.

Furthermore, since the processes of the present embodiment can be achieved by computer programs, the advantage obtained by the present embodiment can be easily achieved by installing the computer programs in a computer through a computer readable storage medium storing the computer programs and executing the programs.

The CPU in the computer in which the programs are installed can function as a processor configured to execute each function. The display controller in the computer can function as a display processor configured to display strokes on the screen.

Furthermore, the present embodiment has been explained giving a tablet computer for exemplification. However, the functions of the present embodiment can be achieved in a normal desktop personal computer. In this case, a tablet or the like as an input device for handwriting input will be connected to the desktop personal computer.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
   a touch screen display; and
   a processor configured to execute a handwriting application including (i) a function of displaying on the touch screen display first handwritten characters input by handwriting using the touch screen display and (ii) a handwriting collaboration function of displaying on the touch screen display a plurality of second handwritten characters which are transmitted from a plurality of other electronic devices, and to record audio data input through a microphone in a memory, wherein the processor is further configured to:
      determine whether or not a handwriting input is performed in the electronic device during a period of recording of the audio data;
      when the handwriting input is performed in the electronic device during the period of recording of the audio data, transmit a first handwriting input start event and a first handwriting input end event of the first handwritten characters to the plurality of other electronic devices;

when second handwriting input start events and second handwriting input end events of the second handwritten characters are received from the other devices during the period of recording of the audio data, store the second handwriting input start events and the second handwriting input end events of the second handwritten characters in the memory;

divide the recorded audio data into a plurality of sections arranged along a time axis direction of the recorded audio data;

calculate, based on the first handwriting input start event and the first handwriting input end event of the first handwritten characters, and the second handwriting input start events and the second handwriting input end events of the second handwritten characters, a number of users who performed handwriting inputs or a number of devices by which handwriting inputs are performed, for each of the plurality of sections of the recorded audio data; and instruct the touch screen display to display a recorded data view that includes display portions representing one or more sections in which the calculated number of users or the calculated number of devices is larger than a threshold.

2. The electronic device of claim 1, wherein the display portions representing one or more sections in which the calculated number of users or the calculated number of devices is larger than a threshold are displayed in a display style different from that of display portions representing sections in which the calculated number of users or the calculated number of devices is smaller than the threshold.

3. The electronic device of claim 1, wherein the recorded data view includes the display portions representing one or more sections in which the calculated number of users or the calculated number of devices is larger than a threshold and does not include any display portions representing sections in which the calculated number of users or the calculated number of devices is less than a threshold.

4. The electronic device of claim 3, wherein the processor creates a digest of the recorded audio data that is obtained by combining the sections having high priority, and instructs the touch screen display to display the digest of the recorded audio data as the recorded data view.

5. The electronic device of claim 1, wherein the recorded data view has a horizontal axis and a vertical axis, the horizontal axis representing the plurality of sections of the recorded audio data, and the vertical axis representing the calculated number of users or the calculated number of devices, for each of the plurality of sections.

6. The electronic device of claim 1, wherein
the recorded data view includes (i) a timeline display area indicative of a time axis of the recorded audio data; and (ii) a bar area displaying a part of the plurality of sections, and
the calculated number of users or the calculated number of devices is displayed in the bar area.

* * * * *